April 22, 1952　　　C. A. DEAN　　　2,593,994
FISHING TOOL
Filed March 7, 1949
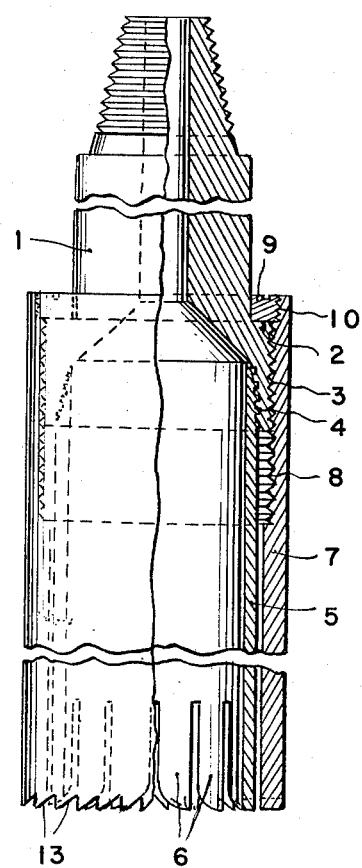
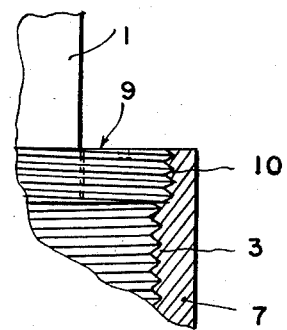
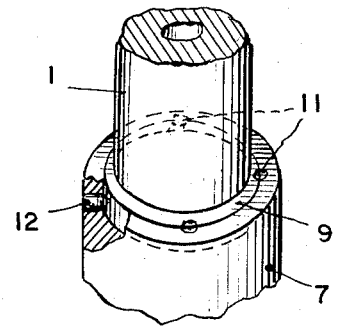
INVENTOR
CHARLES A. DEAN,
BY　　*J. Howard Flint.*
ATTORNEY Patented Apr. 22, 1952

2,593,994

UNITED STATES PATENT OFFICE 2,593,994

FISHING TOOL

Charles Amos Dean, Los Angeles, Calif.

Application March 7, 1949, Serial No. 79,930

4 Claims. (Cl. 294—86)

This invention relates to apparatus to retrieve articles from a bore-hole in the earth, as for example to retrieve broken drill tools from the bottom of an oil well. Such retrieving apparatus is called a fishing tool. This particular invention pertains to a variety of fishing tool designated as an orange-peel tool, because it terminates in a group of segmental fingers.

A fishing tool is operated by being lowered into a bore-hole and then manipulated to engage pieces of tools or debris at the bottom of the hole. This involves rotating the long drill rod that extends from the surface of the bore. Also the tool has had to be lifted and dropped to feel for the broken pieces to be retrieved. All this has required considerable skill by the operator, for the drill stem is very heavy and may extend a mile or more into the earth. One object of this invention is to simplify and to assure dependable, semi-automatic action by the fishing tool.

The head of the fishing tool must be kept secure and tight on the end of the drill stem, yet be readily removable when its work is finished. Often the weight and movement of lowering the stem loosens the tool. Usually the extent of this weakness is not known to the operator. In the present invention this difficulty is recognized. One object of this invention is to maintain the fishing tool tight on the drill stem during its descent and use, and to accomplish this in simple manner.

A purpose of this invention is to provide a fishing tool assembly that is attachable or removable from a drill stem quickly and easily but is dependably secured to the stem. A further purpose of this invention is to protect the fishing tool operating elements during descent of the tool but in positive and simple manner release or expose the operative parts of the tool when the retrievable articles are reached. These purposes recognize the desirability of organizing the fishing tool so it operates reliably without requiring skill of an operator. Other objects and advantages of this invention further appear in this description, in the attached drawings and the appended claims.

The drawings show an illustrative embodiment of this invention, in which

Fig. 1 is a longitudinal view, partly in section, of a drill head and attached fishing tool, Fig. 2 is an enlarged section of a means to engage the fishing tool with the drill stem, and Fig. 3 shows in perspective an alternative means to engage the fishing tool with the drill stem.

More detailed description with reference to these figures is made to explain by example rather than to limit this invention.

Benefits of this invention are obtained in securing grabbing elements of the fishing tool to the drill head within an outer protecting shell that is fastened tightly to the drill stem. Simple breakable means are arranged to fasten the stem to the outer shell, preferably outside the stem.

With more detailed reference to the particular form of this invention illustrated in the drawings, the figures show the end 1 of a rotary drill stem threaded for connection to drill pipe in usual manner. The bottom of the stem 1 is enlarged somewhat to form an outer shoulder 2 and the stem carries external threads 3 below the shoulder. Internally the stem is hollow, with the end somewhat enlarged below the shoulder. In the inner wall are threads 4. Thus the end section of the drill stem is simple, is enlarged somewhat at the bottom and contains threads in both the inner and outer walls of the enlargement.

The fishing tool grab elements proper comprise a shell 5 fitting into the bottom chamber of the drill stem. Shell 5 or fingers 6 are relatively frail with respect to outer shell 7. At its top, shell 5 in the form illustrated is threaded to screw into internal threads 4 of the stem extension. At its bottom, shell 5 is cut peripherally into longitudinal segments or fingers 6. These finger edges are curved or angled upwardly so that as weight is imposed on them against the earth bottom the ends bend inwardly at the bottom and thus form a basket under articles lying on bottom. Fingers 6 may be formed simply by cutting with a blow torch, or otherwise.

To prevent damage or premature collapse of basket fingers 6, an outer shell 7 is threaded around the stem by threads 8 engaging the external threads 3. Shell 7 extends from the bottom of basket fingers 6 or below to above shoulder 2 so as to give adequate protection and strength. A feature of this invention is that threads 8 on the inner wall of shell 7 extend a considerably greater distance down the wall than the extent of outer stem threads 3. This is so that stem 3 may move down a considerable distance relatively to shell 7. In fact, the desired distance is about the length of basket fingers 6 so that when the tool is on bottom the fingers 6 may thread down and emerge fully below shell 7.

A further feature of this invention lies in provision of simple means to lock outer shell 7 and drill stem 1 together. Such means must be applied easily in the field, but be of simple construction, yet must be reliable and must release substantially automatically at the bottom of the drill hole. Nothing in this locking structure should interfere with simple and positive operation of the fishing basket.

Figs. 1 and 2 show locking means comprising a ring 9 rested on outer shoulder 2 of the drill stem and threaded into the upper end of outer shell 7. As an important feature of this invention, ring 9 is threaded with left-hand threads, with the corresponding threads at the top of shell 7 also left-hand threads, for mutual threading of ring 9 and shell 7. These left-hand threads 10 are in contrast to the usual right-hand threads elsewhere in the drill stem and fishing tool. Left-hand threads 10 preferably are finer cut or of slighter depth than threads 8 lower in shell 7; they also are of slightly greater clearance diameter so as to permit shell 7 to be threaded onto the bottom of drill stem 1. Ring 9 may simply fit around stem 1 or may wedge slightly down against the stem as desired.

Ring 9 may be secured lightly to shell 7 by occasional light spot welds 11 or set screws 12, as illustrated in Fig. 3. Such welds, serving to minimize relative turning between shell 7 and ring 9, may be applied in addition to left-hand threads 10 or in lieu thereof.

Ring 9 is secured to outer shell 7, whether by threads 10 or spot welds 11 or otherwise, so that relative turning between the two is prevented when torque forces applied to the shell are relatively minor. But when greater torque is applied, herein termed major torque, then the bond between shell 7 and ring 9 automatically breaks. This break occurs when counter-clockwise torque on outer shell 7 is sufficient to strip the fine threads 10 or to break spot welds 11. This will be apparent by considering for example in Fig. 1 that counter-clock torque, or screwing up, on shell 7 would tend to move shell 7 up relatively to drill stem 1 with its right-hand threads, but tend to move shell 7 down relatively to ring 9 with its left-hand threads. Since ring 9 normally is tight on shoulder 2, any tendency for shell 7 to turn counter-clockwise tends to draw ring 9 down even tighter against shoulder 2 of stem 1. Thus any tendency of shell 7 to turn counter-clockwise is counteracted and dissipated until major force is applied. This distinction between major and minor torque on shell 7 is relative but is readily fixed in any given case by the breaking strengths designed for left thread 10 or for spot welds 11, as those skilled in the art will now understand.

It will be evident from this description or by observation of Fig. 1 that when drill stem 1 is screwed down along the inner threads of shell 7, the stem carries down with it the toothed grab basket 5 that was fastened inside the head of the drill stem. This of course is movement relatively to shell 7. For this relative movement to occur, shell 7 must be held sufficiently against turning with stem 1 and the bond 10 or 11 between stem 1 and shell 7 must be broken. Normally this occurs from the power applied to turn stem 1 when shell 7 reaches the bottom of a drill hole and is held there by the usual considerable weight of a drill stem.

With this specific description of illustrative forms of this invention, operation of the fishing tool will be clear. The drill stem and attached fishing tool are lowered into a drill hole containing broken tools to be retrieved. As the stem is lowered it is kept rotating clockwise, as drill stems are usually rotated. This rotation facilitates lowering the stem and tool freely and tends to turn outer shell 7 past obstructions in the wall of the bore. If obstructions tend to bind shell 7, nevertheless the tight, or even tightening, bond ring 9 keeps shell 7 in rotation with stem 1. During this descent, inner toothed tool 5 is kept protected inside shell 7.

When the tool is on bottom of the bore, the lower serrated edge 13 of shell 7 is pressed into the earth by the full weight of the drill stem above head 1, so that shell 7 is held from rotating. Consequently as stem 1 continues to rotate under power it breaks the threaded or welded bond of sealing ring 9. Thus inner tool shell 5 is free to move downwardly as stem 1 is free to thread down inside protecting shell 7.

When the tool 5 thus is free to work downwardly, the finger elements 6 on the bottom of the shell are forced to curve inwardly along the floor of the earth bore. This results partly from the pointed shape of these elements 6 and partly from the tremendous force on these points from the weight of the drill stem augmented by the force of the stem turning in threads 8 of the outer shell. As the drill stem pushes fingers 6 inwardly along the earth floor of the bore, these fingers work under broken tools and the like. They form a basket bottom under the pieces to be retrieved. Rotation of the drill aids the fingers to dislodge and to retain pieces of tools. This operation minimizes any requirement of skill on the part of the operator but requires only the normal turning of a drill stem and eliminates "hunting" or raising and lowering of the drill as formerly required to retrieve tools. The entire operation is substantially automatic, for release of the protecting cylinder occurs of itself when the fishing tool is sufficiently engaged with the earth bottom for the tool fingers to work under lost tools.

Although, in accordance with the Patent Statutes, this invention is described with reference to specific embodiments and forms, as best contemplated at present, it will now be evident to those skilled in the art that variations and changes may be made within the scope of the appended claims.

What is claimed is:

1. An earth-bore fishing tool comprising an outer shell, a drill stem extension threaded inside and out, an inner cylinder carrying basket fingers at its lower end being threaded to the inside of the stem extension, the outer shell extending down sufficiently to protect the basket fingers and being threaded to the outside of the stem extension extensively enough to twist upon the stem and uncover the basket fingers, and locking means between the basket cylinder and the outer shell to prevent relative rotation between the two, the locking means being frangible by torque on the outer shell whereby the shell can be twisted upwardly to uncover the basket fingers.

2. An earth-bore fishing tool comprising a drill-stem head forming a cylindrical shell, the shell being threaded inside and outside, an inner cylinder carrying basket fingers at its lower end and threaded for attachment to the inside of the stem head, an outer cylinder threaded for attachment to the outside of the stem head, the drill-stem head comprising an outer shoulder portion, means secured against the shoulder and binding the outer shell to the stem against rotation, the said binding means being frangible by torque on the outer cylinder.

3. An earth-bore fishing tool comprising a drill-stem head forming a cylindrical shell, the shell being threaded inside and outside, an inner cylinder carrying basket fingers at its lower end and threaded at its top for attachment to the inside of the stem head, an outer protecting cylinder threaded for attachment to the outside of the stem head, the drill-stem head comprising an outer shoulder portion, a ring seated on the shoulder, the ring and an upper portion of the outer cylinder being mutually threaded oppositely to the thread between the outer cylinder and the stem head, the mutual ring and cylinder thread being relatively frangible for release by torque on the outer cylinder.

4. An earth-bore fishing tool comprising a drill-stem head forming a cylindrical shell, an inner cylinder carrying basket fingers at its lower end, means to secure the cylinder within the shell, an outer cylinder and threaded connection between the outer cylinder and the shell, the threaded connection extending sufficiently for the shell to carry the basket fingers out of the outer cylinder, a binding ring seated between the shell and the outer cylinder and in mutually threaded engagement with the outer cylinder oppositely to the threaded connection between said cylinder and the shell, said engagement being frangible by torque on the outer cylinder.

CHARLES AMOS DEAN.

REFERENCES CITED

The following references are of record in the file of this patent:

UNITED STATES PATENTS

| Number | Name | Date |
| --- | --- | --- |
| 1,552,755 | Pyron | Sept. 8, 1925 |
| 1,582,904 | Conrey | May 4, 1926 |
| 1,720,059 | Rutherford | July 9, 1929 |
| 1,750,744 | Chamberlain | Mar. 18, 1930 |
| 2,318,885 | Osmun | May 11, 1943 |